(12) United States Patent
Klein et al.

(10) Patent No.: US 7,328,228 B2
(45) Date of Patent: Feb. 5, 2008

(54) MAPPING PSEUDO-RANDOM NUMBERS TO PREDEFINED NUMBER RANGES

(75) Inventors: Udo Klein, Maximiliansau (DE); Peter Januschke, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 732 days.

(21) Appl. No.: 10/653,789

(22) Filed: Sep. 2, 2003

(65) Prior Publication Data

US 2005/0050121 A1 Mar. 3, 2005

(51) Int. Cl.
*G06F 1/02* (2006.01)
(52) U.S. Cl. .................................................. 708/250
(58) Field of Classification Search ................ 708/250, 708/252
See application file for complete search history.

(56) References Cited

U.S. PATENT DOCUMENTS

| | | | | |
|---|---|---|---|---|
| 5,251,165 | A * | 10/1993 | James, III | 708/250 |
| 5,379,422 | A | 1/1995 | Antoshenkov | |
| 5,911,009 | A * | 6/1999 | Ikuta | 382/237 |
| 6,044,388 | A | 3/2000 | DeBellis et al. | |
| 6,192,385 | B1 | 2/2001 | Shimada | |
| 2002/0138746 | A1* | 9/2002 | Buttner et al. | 713/189 |
| 2003/0028567 | A1* | 2/2003 | Carlson | 708/250 |
| 2005/0044119 | A1* | 2/2005 | Langin-Hooper et al. | 708/250 |

FOREIGN PATENT DOCUMENTS

WO 03/063423 A1 7/2003

OTHER PUBLICATIONS

"Pseudorandom number generator", http://www.wikipedia.org/wiki/Pseudo-random_number_generator (retrieved from the Internet on Aug. 17, 2003).
"Mersenne Twister: A random number generator" [online], [retrieved on Dec. 10, 2003]. Retrieved from the Internet: <URL: http://www.math.keio.ac.jp/~matumoto>.
L'Ecuyer et al. "An Object-Oriented Random-Number Package with Many Long Streams and Substreams,", Operations Research, vol. 50, No. 6 (2002), pp. 1073-1075.

* cited by examiner

*Primary Examiner*—Chuong D. Ngo
(74) *Attorney, Agent, or Firm*—Fish & Richardson P.C.

(57) ABSTRACT

Pseudo-random numbers (PRNs) generated by a PRN generator are mapped to predefined number ranges or target ranges. The target range may be smaller or larger than the range of the PRN generator. Mapping to a smaller target range may include generating PRNs (e.g., integers) from a particular bit-input stream (e.g., 32-bit) having a uniform distribution across the range of numbers; selecting an optimal subset of the generated PRNs to map; and mapping the selected PRNs to a corresponding number in a target range such that the mapped numbers are uniformly distributed across the target range. Mapping to a larger target range may include generating uniformly distributed PRNs; applying a generation function to the PRNs to generate uniformly distributed packed numbers; and applying a mapping function to map selected packed numbers to the target range such that the mapped numbers are uniformly distributed.

27 Claims, 5 Drawing Sheets

MAPPING PSEUDO-RANDOM NUMBERS TO PREDEFINED NUMBER RANGES

BACKGROUND

The following description relates to generating a desired range of pseudo-random numbers ("PRNs"), for example, by mapping pseudo-random numbers to predefined or arbitrary number ranges.

Pseudo-random number generators ("PRNGs") are an important part of modern computing, finding use in various applications including statistical simulations, generative modeling, cryptography and the Monte Carlo method for simulating physical systems. The capability to generate PRNs typically is a standard feature of most software programming environments.

Generating PRNs usually is implemented by one or more algorithms that generate a series of uncorrelated numbers, with each succeeding random number using the previous result as its seed. Thus, by knowing what the original seed is, along with the algorithm used, the same sequence of numbers can be re-generated in a predictable manner. The PRNs are considered pseudo-random, as opposed to truly random, because, even though they are deterministic based on the seed and algorithm used, the sequence of PRNs is relatively uncorrelated and appears random for most statistical tests. To that end, most PRNG algorithms produce numbers that tend to be uniformly distributed across a predetermined range of numbers, for example, between 0 and $2^{31}-1$.

Common classes of PRNGs are linear congruential generators, lagged fibonacci generators, linear feedback shift registers and generalised feedback registers. More recent examples of PRNG's include Blum Blum Shub, Fortuna, and the Mersenne Twister. Each class of PRNG exhibits different properties, which generally relate to the quality of the PRNs that are generated. Typical of these classes of PRNGs is that the generated output range may not match what is desired or needed for some applications, such as picking random samples from a given range (e.g., picking 10 out of 1000 delivered goods for quality testing), which would require the generation of PRNs in a range $1, \ldots, 1000$. Typical PRNGs, however, generate PRNs in a range $0, \ldots, 2^b-1$, where b is the bit length of a b-bit PRNG, for example, a 32-bit PRNG generates PRNs in a range $0, \ldots, 2^{32}-1$. The number of PRNs in such a range, i.e., the period, is $2^{32}-1$.

SUMMARY

The present inventors recognized that conventional PRNGs tended to be inflexible in their ability to generate variable output ranges and periods. Consequently, the present inventors developed systems and techniques that enable designers to map a source range generated by a conventional PRNG to a smaller or larger desired output range, while maintaining the uniform distribution of the generated PRNs. Systems and techniques, including computer program products, for output range mapping in a computer system are provided.

The system and techniques may include operations, such as: generating PRNs, which may be integers, having a uniform distribution in a source range, usually a range $0, \ldots, 2^b-1$, where b is the bit input stream to a PRNG, such as a 32-bit input stream; selecting an optimal subset of the generated PRNs to map; and mapping the selected PRNs to a corresponding number in a target range or a desired output range such that the mapped numbers are uniformly distributed across the target range or the desired output range, i.e., the pseudo randomness of the PRNs is maintained.

The size of the source range may be characterized as R+1 (or, alternatively, $2^b$), the size of the target range or desired output range may be characterized as B, and the operation of selecting the optimal subset of PRNs includes identifying or obtaining those PRNs that fall between 0 and L, where L, which provides an optimal match to the target or desired output range, is derived from R and B. The size of the target or desired output range typically is smaller than the size of the source range. However, in some implementations, the size of the target or desired output range may be larger than the size of the source range.

For instances where the size of the target or desired output range is larger than the source range, the system and techniques may include operations, such as: generating uniformly distributed PRNs in a source range; applying a generation function to the PRNs to generate uniformly distributed packed numbers, which may be integers; and applying a mapping function to the uniformly distributed packed numbers to map selected packed numbers to corresponding numbers in the target or desired output range such that the mapped numbers are uniformly distributed. The operation of applying a generation function to the PRNs to generate uniformly distributed packed numbers may include: generating one or more unsigned component packed numbers and a signed component packed number; and forming the packed numbers from the component packed numbers. The operation of applying a mapping function to the uniformly distributed packed number to map selected packed numbers may include: computing the size of the target or desired output range; obtaining the packed numbers that fall within an optimal range; and mapping each obtained packed number to a corresponding number in the target range or desired output range so that the mapped packed number in the target range or desired range is uniformly distributed relative to other mapped packed numbers.

The number of input bits b necessary to generate PRNs to be mapped to a target range or desired output range may be minimized by minimizing the following equation $$\frac{b}{1 - \frac{2^b \bmod B}{2^b}}.$$

The systems and techniques described here may provide one or more of the following advantages. For example, generating unnecessary PRNs can be avoided, which, depending on the PRNG utilized, can reduce the cost of generating such numbers. Also, the range of PRNs can be tailored to the particular application needing PRNs. Thus, in those applications requiring a range of numbers that is not some power of two, the systems and techniques described here can generate the desired range of PRNs. Moreover, if the PRNs generated by a PRNG are uniformly distributed, the numbers in the desired output range that are mapped to the PRNs are uniformly distributed as well. Thus, the systems and techniques described do not diminish the pseudo randomness (i.e., uniform distribution) of the mapped numbers.

The details of one or more implementations are set forth in the accompanying drawings and the description below.

Other features and advantages will be apparent from the description and drawings, and from the claims.

DESCRIPTION OF DRAWINGS

Like reference symbols in the various drawings indicate like elements.

DETAILED DESCRIPTION

Mapping to a Smaller Desired Output Range

Figure 1:
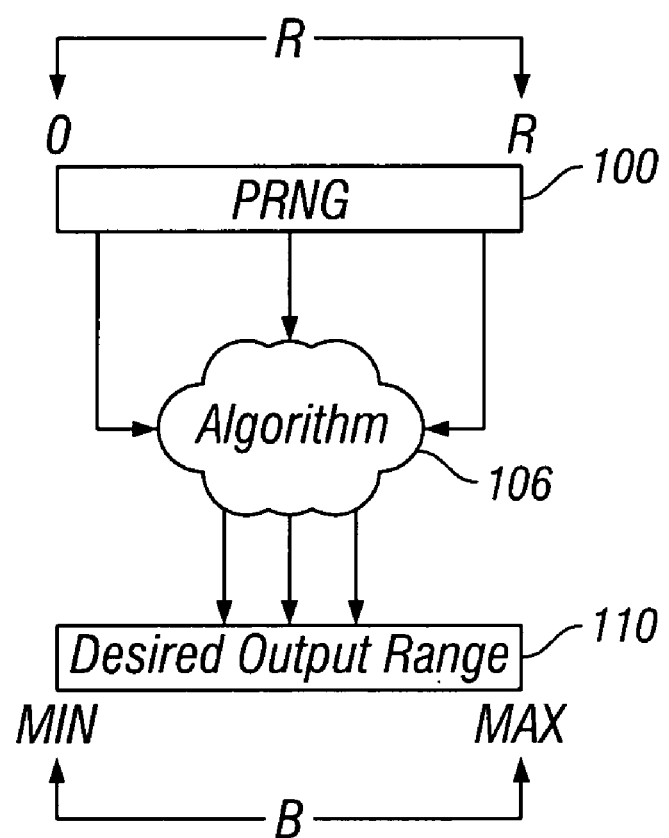
FIG. 1 is an illustration of a technique to map the output range of a PRNG to a smaller desired output range.

FIG. 1 illustrates, in general, a technique for mapping the range of a b-bit PRNG to an arbitrary smaller desired output range or target range. A b-bit PRNG typically can generate uniformly distributed b-bit random numbers in a range 0, 1, ..., R, where R is $2^b-1$. The range of the PRNG may be referred to as a source range. The period of a b-bit PRNG then will be $2^b-1$. In one implementation, PRNG 100 is a 32-bit PRNG. Thus, PRNG 100 has a period of $2^{32}-1$. What this means is that PRNG 100 can generate $2^{32}-1$ integers in the range 0, 1, ..., R, where R is $2^{32}-1$. In this implementation, the smaller Desired Output Range 110 is min, ..., max, with (max−min)$\leq$R. The period of the Desired Output Range 110 is B, which is max−min+1 and is less than the period of PRNG 100. An Algorithm 106, e.g., a mapping function, is used to map the output of PRNG 100 to a smaller Desired Output Range 110. The Algorithm 206 is implemented in C programming language, but other programming languages may be used.

Figure 2:
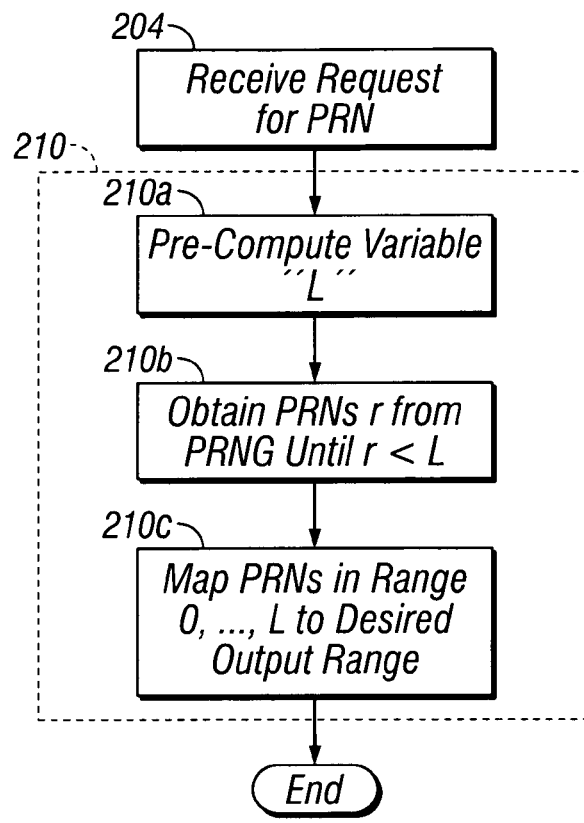
FIG. 2 is a flow chart depicting a process for mapping the output range of a PRNG to a smaller desired output range.

FIG. 2 depicts a process of mapping the output range of a PRNG (e.g., PRNG 100) to a smaller target range or desired output range (e.g., Desired Output Range 110) according to one implementation, e.g., a database application programmed using the Advanced Business Application Programming ("ABAP") language. In step 204, a PRNG manager receives a request for one ore more PRNs in a target range or desired output range. Next, in step 210, the PRNG manager applies a mapping function to the output range of the PRNG.

In step 210a, the mapping function performs arithmetic computations as follows: L=S*B, where B is max−min+1 and S is (R+1) div B, which is the integer part of (R+1)/B. As can be seen from these arithmetic computations, S$\geq$1 given (max−min)$\leq$R and 0$\leq$(R+1−L)<B. The variable L is an optimal match to the desired output range, which is derived from the size of the output of the PRNG and the size of the target or desired output range. Next, in step 210b, the mapping function obtains uniformly distributed pseudo-random numbers r from the PRNG until r<L. In step 210c, the mapping function maps those numbers that fall within the range 0, 1, ..., L to the same number of numbers in the target range or desired output range, which are (r div S)+min. As a result, the mapped numbers in the desired output range or target range are uniformly distributed pseudo-random numbers, i.e., the mapping function can maintain the degree of pseudo-randomness of the pseudo random numbers generated by the PRNG. Thus, if the pseudo-randomness of the pseudo random numbers generated by the PRNG is one of uniform distribution, then the pseudo-randomness of the mapped numbers is one of uniform distribution. Optionally, the objective of steps 210b and 210c could be achieved by causing the PRNG to generate uniformly distributed pseudo-random numbers r until r<L.

The following code module, written in C (although any other language suitable to map pseudo-random numbers could be used), generally is suitable to map pseudo-random numbers to a smaller target range or desired output range:

```
static unsigned int prngIntInRange( int min, int max )
{
  unsigned int delta0 = max − min;
  unsigned int s;
  unsigned int prod;
  unsigned int r;
  unsigned int y;
  if ( delta0 == SAP_UINT_MAX )
  {
    return prngNextNumber( );
  }
  s = ( unsigned int ) ( ( ( SAP_ULLONG ) SAP_UINT_MAX + 1 ) / ( delta0 + 1 ) );
  prod = s * ( delta0 + 1 );
  while ( 1 )
  {
    r = prngNextNumber( );
    if ( r < prod )
      break;
  }
  return ( r / s + min );
}
```

This technique for mapping the output range of a b-bit PRNG to a smaller target range or smaller arbitrary desired output range can be implemented with unsigned long integers. In case min and max are signed integers, the process described above can still be implemented with unsigned long integers, except for computing B (i.e., the size of the desired output range) and the final mapping. This way there is no need for slow extended integer arithmetic, which is possible because the C programming language allows use of both signed and unsigned integer types.

An optional step may be included in the process described above, wherein the number of bits needed to generate mapped uniformly distributed PRNs is minimized. Generally, the probability, P, for discarding a PRN r that is generated by a PRNG is in accordance with the following formula:

$$P=(R+1-L)/(R+1)<B/(R+1)$$

Using the geometric series, it can be determined that, in order to produce a PRN that falls within the target range or desired output range, an average of $1/(1-P)$ PRNs needs to be generated by the PRNG. As can be seen, in cases where B, i.e., the size of the target range or desired output range, is much smaller than R, i.e., the size of the output range of the PRNG, the generation of unnecessary PRNs is minimized.

If the PRNG generates PRNs in the range $0, \ldots, 2^b-1$ and min and max are fixed, then the average number of required random bits may be optimized by minimizing $b/(1-P)$ before the mapping technique is employed. The equation $b/(1-P)$ may be written as follow:

$$\frac{b}{1-\frac{2^b-B\left\lfloor\frac{2^b}{B}\right\rfloor}{2^b}} = \frac{b}{1-\frac{2^b \bmod B}{2^b}}$$

It is sufficient to check for b between ld B and 2 ld B, or in other words, $B \leq 0.2^b \leq B^2$. As can be seen $(2^b \bmod B)/2^b$ is always smaller than $B/2^b$, and will rapidly decrease as b decreases. Thus, the equation $b/(1-P)$ will first decrease but then will quickly increase with b, i.e., if b is twice as large as ld B then the equation will be in the increasing part. Hence, optimal values for b may be found easily by simple trial and error by starting with ld B then considering a small number of trial values resulting from changes to b. Typically, this optional step would precede the others steps described above, particularly if pseudo-random bits are expensive to generate.

In this implementation, where there is a 32-bit input (i.e., b is 32), the optional step may not be necessary given that the size of the target range or desired output range generally is expected to be well below $2^{32}$ and the PRNG generates unsigned long integer numbers.

The discarded PRNs generated by the PRNG (i.e., those generated PRNs that are greater than L) can be re-used for creating a PRN stream in the range $0, \ldots, R-L$. The discarded numbers could be collected and then mapped into the range min, ..., max as well. Collecting and mapping in this manner may be beneficial if arithmetic costs are much lower than the computational generation costs for the PRNs.

Generating and Mapping Packed Numbers to Desired Output Range

One of the numeric data types that ABAP supports is packed integers. Packed integers can be 1 to 16 bytes long, with two decimal digits packed into each byte, and one decimal digit and the sign packed into the last byte. Thus, packed numbers may include up to 31 decimal digits with a range $(1-10^{31}), \ldots, (10^{31}-1)$ and typically are used in calculations of sizes, lengths, weights and sums of money. Generally, four 32-bit numbers are needed to produce uniformly distributed random numbers in this range. Unfortunately, a direct implementation generally would require arithmetics beyond the range of packed integers, which typically is avoided because the cost of implementing and testing such arithmetics is usually considered not worth the theoretical performance gains. Besides, pseudo-random integers generally are preferred for all performance critical issues. Thus, a technique to generate packed numbers using a PRNG, in addition to methodology to map packed numbers to a desired output range, is described below. This technique also could be used any time it is desirable to map PRNs to a range that is larger than the range in which they were generated.

Figure 3:
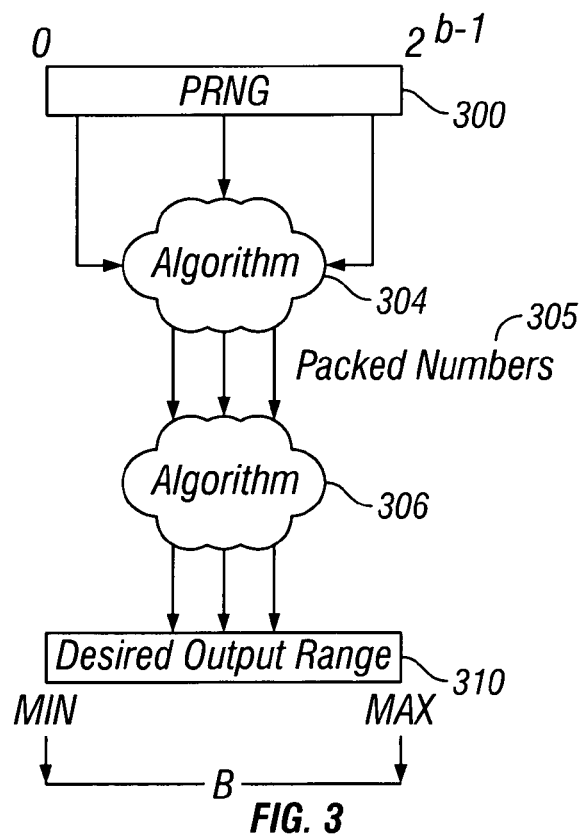
FIG. 3 is an illustration of a technique to generate and map packed numbers to a desired output range.

FIG. 3 illustrates, in general, a technique for generating and mapping packed numbers to a target range or desired output range. As stated above, a b-bit PRNG typically can generate $2^b-1$ uniformly distributed PRNs. In one implementation, PRNG 300 is a 32-bit PRN, which has a period of $2^{32}-1$. An Algorithm 304, e.g., a generation function, obtains these uniformly distributed PRNs to generate Packed Numbers 305, which are used by Algorithm 306, e.g., a mapping function, to map selected Packed Numbers 305 to a target range or Desired Output Range 310 (i.e., min, ..., max) of size B, such that the mapped numbers are uniformly distributed across the target range or the Desired Output Range 310. The Algorithms 304, 306 can be implemented in ABAP and/or other programming languages.

Figure 4:
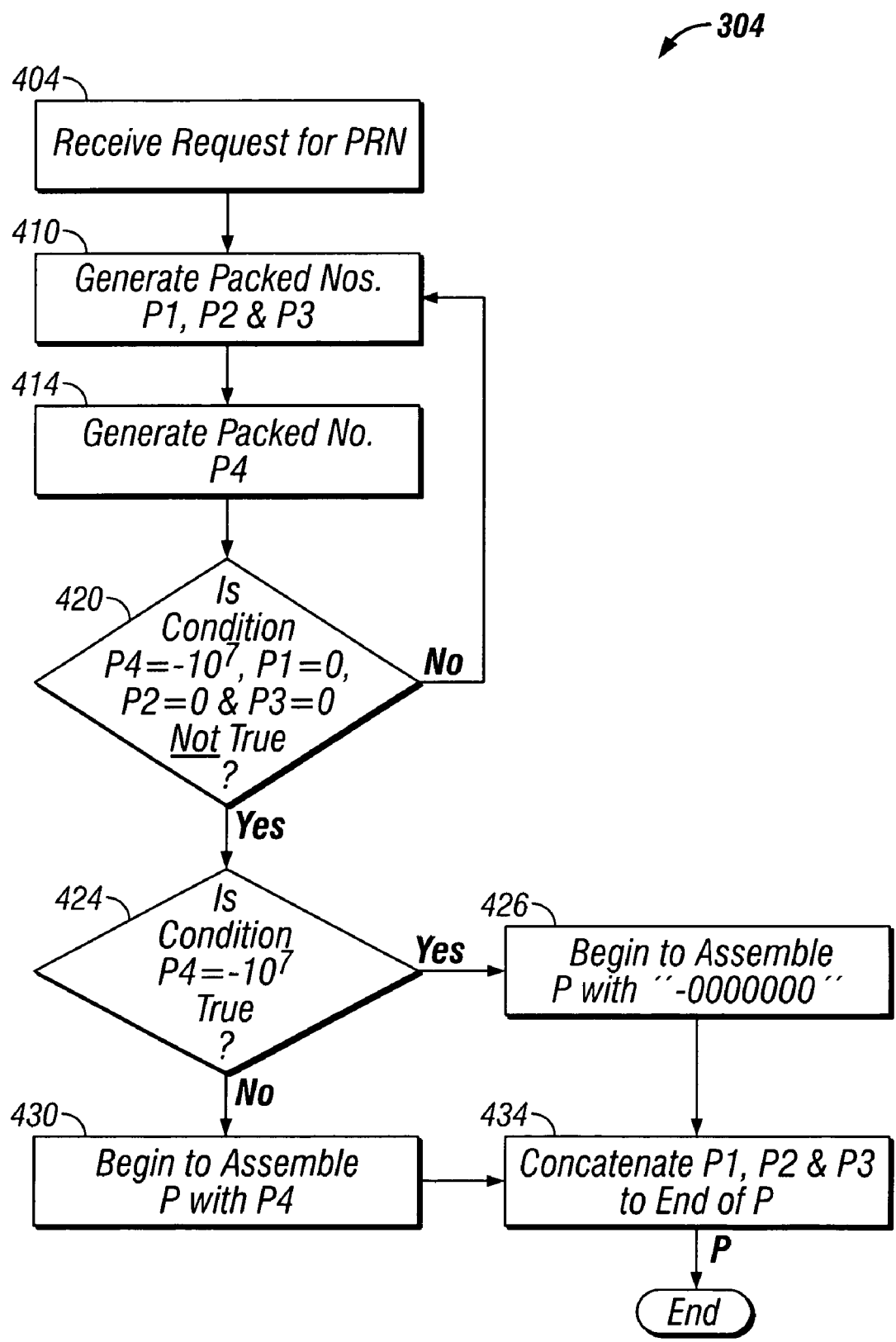
FIG. 4 is a flow chart depicting a process for generating packed numbers.

FIG. 4 illustrates a process that may be executed in Algorithm 304 to generate packed numbers using PRNG 300. In step 404, Algorithm 304 receives a request for one ore more pseudo-random packed numbers. Next, in step 410, the process described above with reference to FIG. 2 is implemented to generate three 8-digit unsigned component packed numbers P1, P2, and P3 that are in the range $0, \ldots, 10^8-1$. On average 1.0226 integer PRNs need to be generated for each packed number P1, P2 and P3, i.e., a total of 3.0678 integer PRNs. In step 414, the process described above with reference to FIG. 2 is again implemented to generate a signed component packed number P4 in the range $-10^7, \ldots, 10^7-1$. On average 1.0035 integer PRNs need to be generated to obtain P4. Thus, on average 4.0714 PRNs need to be generated, which is less than 2% overhead. In step 420, a test is performed to determine whether the following condition is satisfied: $P4=-10^7$ and P1=0 and P2=0 and P3=0. Steps 410 and 414 are repeated until this condition is not true. Also in step 420, P1, P2, P3 and P4 may be discarded in order to achieve a uniform output distribution. However, this event will occur in about 1 in $2*10^{31}$ times, which is negligible. In step 424, if the condition $P4=-10^7$ is true, step 426 is performed in which the first eight places of the output packed number P are "-0000000" and returned. Otherwise, step 430 is performed in which the first eight places of the output packed number P are P4, including the sign. In either step 424 or 430, the output number P will be filled with a sign and 7 digits. Next, in step 434, component packed numbers P1, P2, and P3 are concatenated to the end of the output number P in that order. Thus, at this point, the output number P has a total of one sign and 31 digits. Moreover, the steps just described produce a uniform distribution of packed numbers if the input numbers are uniformly distributed.

Figure 5:
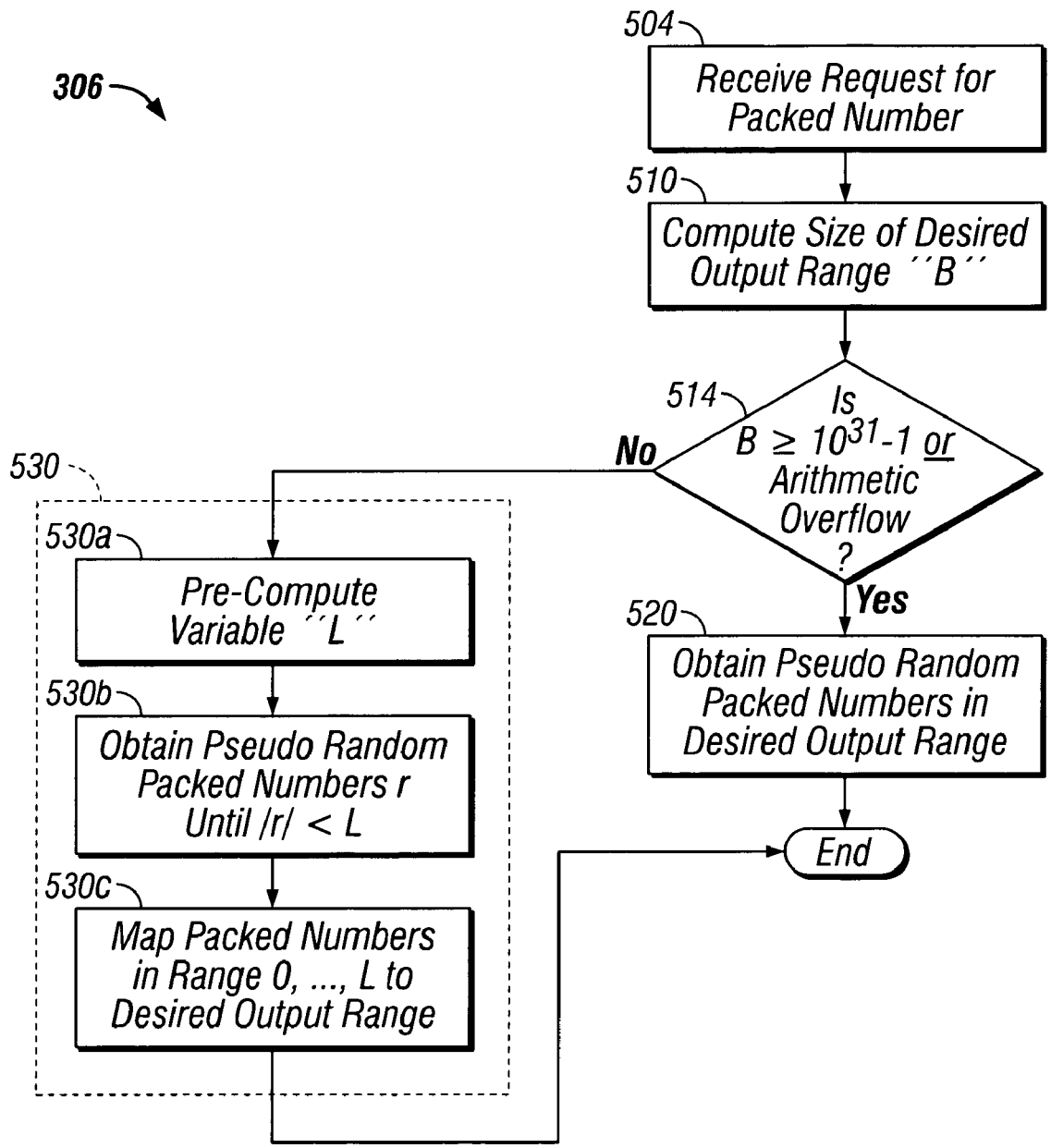
FIG. 5 is a flow chart depicting a process for mapping packed numbers to a desired output range.

FIG. 5 depicts a process that may be executed in Algorithm 406 to map selected packed numbers out of the packed numbers P generated by Algorithm 404 to a target range or the Desired Output Range 410 according to one implementation, e.g., a database application programmed using the Advanced Business Application Programming ("ABAP") language. In step 504, Algorithm 406 receives a request for one ore more pseudo-random packed numbers in a target range or the Desired Output Range 410. Next, in step 510, the size of the target range or the Desired Output Range 410, B, is computed as follows:

$$B = max - min + 1$$

Next in step 514, a test is performed to determine whether either of the following conditions exists: $B \geq 10^{31} - 1$ or arithmetic overflow resulting from step 510. If either of these conditions exists, then direct mapping is required and the process continues to step 520. Otherwise, the process continues to step 530. In step 520, pseudo-random packed numbers are obtained from Algorithm 304 until a packed number is in the target range or the Desired Output Range 410, i.e., in the range min, . . . , max. The packed number is returned in response to the request for a pseudo-random packed number in the target range or the Desired Output Range 410 and the process ends.

In step 530, a mapping function is executed. In step 530a, the mapping function performs arithmetic computations as follows: $L = S*B$, where $S = (10^{31} \text{ div } B)$. The variable L is an optimal match to the desired output range. Next, in step 530b, the mapping function obtains uniformly distributed pseudo-random packed numbers r generated by Algorithm 504 until $|r| < L$. In step 530c, the mapping function maps those packed numbers having absolute values that fall within the range 0, 1, . . . , L to the same number of numbers in the target range or the Desired Output Range 410, which are (|r| div S)+min. As a result, the packed numbers in the target range or the Desired Output Range 410 are uniformly distributed pseudo-random packed numbers. Optionally, the objective of steps 630b and 630c could be achieved by causing the Algorithm 304 to generate uniformly distributed pseudo-random packed numbers r until $|r| < L$.

The direct mapping scenario (step 520) represents a worst case for the above process. In the direct mapping scenario, up to 50% of the intermediate numbers will be discarded. Thus, the worst case cost for generating one mapped packed number is generating 8.15 unsigned integer pseudo-random numbers. However, it is expected that the typical desired output range is much smaller than $10^{31}$. Hence, the typical cost is generally closer to 4.1 unsigned integer PRNs.

The following code module, written in ABAP (although any other language suitable to generate and map packed numbers could be used), generally is suitable to generate and map pseudo-random packet numbers to a target range or a desired output range:

```
METHODS packedinrange
   IMPORTING
     min TYPE p31_0
     max TYPE p31_0
   RETURNING
     VALUE(value) TYPE p31_0.
   CONSTANTS max_packed TYPE p31_0 VALUE '9999999999999999999999999999999'.
     DATA raw_pseudo_random_number        TYPE p31_0.
     DATA range                           TYPE p31_0.
     DATA bin_size                        TYPE p31_0.
     DATA collective_bin_size             TYPE p31_0.
     DATA direct_mapping_required         TYPE abap_bool VALUE false.
     IF min > max.
       RAISE EXCEPTION TYPE cx_abap_random.
     ENDIF.
     TRY.
         range = max - min + 1.
         IF range >= max_packed.
           direct_mapping_required = true.
         ENDIF.
       CATCH cx_sy_arithmetic_overflow.
         direct_mapping_required = true.
     ENDTRY.
   IF direct_mapping_required = false.
     bin_size = max_packed DIV range.
     collective_bin_size = bin_size * range.
   ENDIF.
   IF direct_mapping_required = true.
     DO.
       raw_pseudo_random_number = me->packed( ).
       IF raw_pseudo_random_number <= max AND
          raw_pseudo_random_number >= min.
         value = raw_pseudo_random_number.
         RETURN.
       ENDIF.
     ENDDO.
   ELSE.
     DO.
       raw_pseudo_random_number = me->packed( ).
       IF raw_pseudo_random_number < 0.
         raw_pseudo_random_number = - raw_pseudo_random_number.
       ELSEIF raw_pseudo_random_number = 0.
```

```
        CONTINUE.
      ENDIF.
      IF raw_pseudo_random_number > collective_bin_size.
        CONTINUE.
      ELSE.
        EXIT.
      ENDIF.
    ENDDO.
    value = ( raw_pseudo_random_number − 1 ) DIV bin_size + min.
      RETURN.
    ENDIF.
ENDMETHOD.
```

Figure 6:
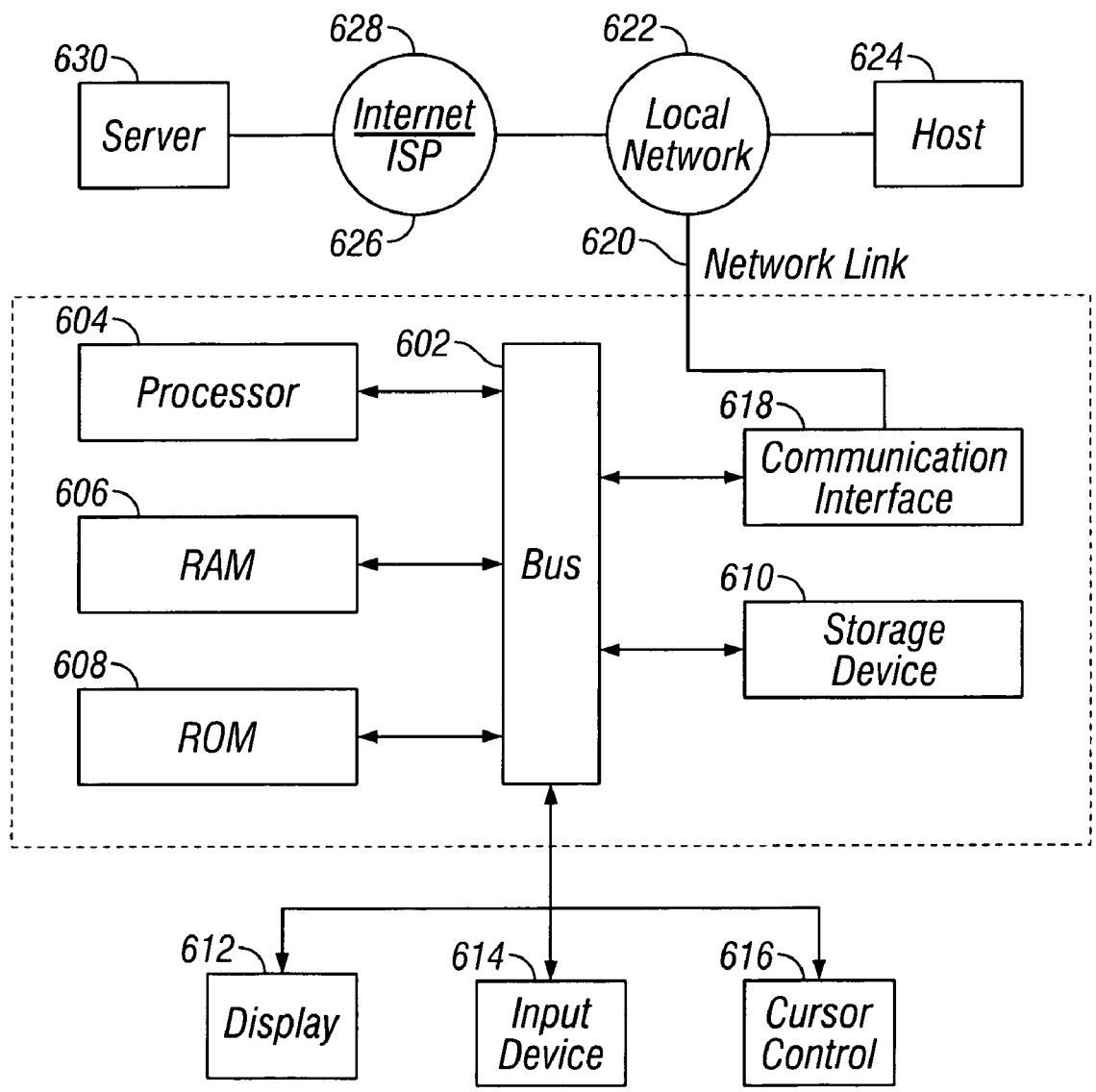
FIG. 6 is a block diagram of a computer system that may be used to implement the PRN generation systems and techniques described here.

FIG. 6 is a block diagram that illustrates a computer system 600, such as a programmable data processing system, in which the PRNG range mapping techniques described herein may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), liquid crystal display (LCD), or plasma television, for displaying information to a computer user. An input device 614, including alphanumeric and other keys, is coupled to bus 602 for communicating information and command selections to processor 604. Another type of user input device is cursor control 616, such as a mouse, a trackball, key switch, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The PRNG range mapping techniques are used with computer system 600. According to one embodiment, PRNG range mapping is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the PRNG range mapping techniques. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, DVD, or any other optical medium, punch cards, paper tape, or any other physical medium with patterns of holes, a RAM, a PROM, and EPROM, a FLASH-EPROM, or any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, a broadband integrated services digital network (B-ISDN), a modem to provide a data communication connection to a corresponding type of telephone line or any other communication interface known to one of ordinary skill. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In one aspect, one such downloaded application provides for PNRG range mapping as described herein.

Processor 604 may execute the received code as it is received, and/or stored in storage device 610, or other non-volatile storage for later execution. In this manner, computer system 600 may obtain application code in the form of a carrier wave.

The techniques described above to map PRNs to a target range ensure that the randomness of the mapped numbers is maintained because the mapping is uniformly distributed across the target range. Moreover, these techniques can be used to generate PRNs in any arbitrary desired range using an algorithm that is computationally inexpensive, works well with virtually any programming language, and is relatively easy to implement.

In the foregoing specification, a number of embodiments have been described. Nevertheless, it will be understood that various modifications may be made. The specification and drawings are to be regarded in an illustrative rather than a restrictive sense. For example, steps in a flowchart may be replaced with other steps, additional steps may be added, some steps optionally may be removed, and/or steps may be performed in a different order, or in parallel, relative to the order depicted. Accordingly, other embodiments are within the scope of the following claims.

What is claimed is:

1. A method for generating pseudo-random numbers in a target range, the method comprising:
   generating a plurality of pseudo-random numbers having a uniform distribution in a source range;
   selecting an optimal subset of the plurality of pseudo-random numbers to map;
   mapping each of the selected pseudo-random numbers to a corresponding mapped number in the target range such that the mapped numbers are uniformly distributed across the target range; and
   using the mapped numbers in an application, the application being one of a statistical simulation application, a generative modeling application, a cryptography application, or a Monte Carlo application for simulating physical systems.

2. The method of claim 1 wherein the source range is from 0 . . . R, the target range has a size B, and selecting the optimal subset of pseudo random numbers comprises identifying those pseudo random numbers that fall between 0 and L, where L is derived from R and B and provides an optimal match to the target range.

3. The method of claim 2, wherein R is determined according to the following equation $2^b-1$, where b is the number of input bits.

4. The method of claim 3, wherein b is 32.

5. The method of claim 3 further comprising minimizing the number of input bits b needed to generate pseudo-random numbers that fall within the desired output range.

6. The method of claim 5 wherein minimizing the number of input bits b comprises minimizing $$\frac{b}{1 - \frac{2^b \bmod B}{2^b}}.$$

7. The method of claim 2, wherein the source range has a size R+1, and B is numerically smaller than R+1.

8. The method of claim 1, wherein the pseudo random numbers comprise integers.

9. The method of claim 1, wherein generating a plurality of pseudo-random numbers having a uniform distribution comprises using a pseudo-random number generator.

10. The method of claim 1, wherein selecting an optimal subset of the plurality of pseudo-random numbers comprises:
    calculating L, where L provides an optimal match to the target range of min, . . . , max and is derived from the following equation L=S*B, where B is max−min+1 and S is(R+1) div B;
    receiving the plurality of pseudo-random numbers having a uniform distribution; and
    identifying those pseudo-random numbers r that fall within the range 0, . . . , L.

11. The method of claim 10 wherein the mapped numbers satisfy the following equation (r div S)+min, where r is the corresponding selected pseudo-random number.

12. A method for generating uniformly distributed pseudo-random numbers in an arbitrary target range, the method comprising:
    generating a plurality of pseudo-random numbers F having a uniform distribution in a range 0 to R;
    mapping the plurality of pseudo-random integer numbers F to an arbitrary target range of size B by (i) obtaining those pseudo-random numbers F that fall in a range 0 to L, where L is derived from R and B and provides an optimal match to the desired range, and (ii) mapping each pseudo-random number F falling in a range 0 to L to a corresponding mapped number in the target range so that the mapped number in the target range is uniformly distributed relative to other mapped numbers; and
    using the mapped numbers in an application, the application being one of a statistical simulation application, a generative modeling application, a cryptography application, or a Monte Carlo application for simulating physical systems.

13. A method for generating uniformly distributed pseudo-random packed numbers in an arbitrary desired range, the method comprising:
    generating uniformly distributed pseudo-random numbers;

applying a generation function to the pseudo-random numbers to generate uniformly distributed packed numbers;

applying a mapping function to the uniformly distributed packed numbers to map selected packed numbers to corresponding mapped numbers in the arbitrary desired range such that the mapped numbers are uniformly distributed; and using the mapped numbers in an application, the application being one of a statistical simulation application, a generative modeling application, a cryptography application, or a Monte Carlo application for simulating physical systems.

14. The method of claim 13, wherein applying a generation function to the pseudo-random numbers to generate uniformly distributed packed numbers comprises:

generating one or more unsigned component packed numbers and a signed component packed number; and forming the packed numbers with the component packed numbers by concatenating the unsigned component packed numbers to the signed component packed number.

15. The method of claim 13, wherein applying a mapping function to the uniformly distributed packed number to map selected packed numbers comprises:

computing the size of the desired output range;

obtaining those uniformly distributed packed numbers having absolute values that fall in the range $0 \ldots L$, where L provides an optimal match to the desired output range; and mapping each obtained packed number to a corresponding mapped packed number in the desired output range so that the mapped packed number in the desired range is uniformly distributed relative to other mapped packed numbers.

16. A computer system configured to perform operations comprising:

generating a plurality of pseudo-random numbers having a uniform distribution in a source range;

selecting an optimal subset of the plurality of pseudo-random numbers to map;

mapping each of the selected pseudo-random numbers to a corresponding mapped number in the target range such that the mapped numbers are uniformly distributed across the target range; and using the mapped numbers in an application, the application being one of a statistical simulation application, a generative modeling application, a cryptography application, or a Monte Carlo application for simulating physical systems.

17. The computer system of claim 16, wherein the source range is from $0 \ldots R$, the target range has a size B, and selecting the optimal subset of pseudo random numbers comprises identifying those pseudo random numbers that fall between 0 and L, where L is derived from R and B and provides an optimal match to the target range.

18. The computer system of claim 17, wherein R is determined according to the following equation $2^b-1$, where b is the number of input bits.

19. The computer system of claim 18 further comprising minimizing the number of input bits b needed to generate pseudo-random numbers that fall within the desired output range.

20. The computer system of claim 19 wherein minimizing the number of input bits b comprises minimizing $$\frac{b}{1-\frac{2^b \bmod B}{2^b}}.$$

21. A computer system configured to perform operations comprising:

generating uniformly distributed pseudo-random numbers;

applying a generation function to the pseudo-random numbers to generate uniformly distributed packed numbers;

applying a mapping function to the uniformly distributed packed numbers to map selected packed numbers to corresponding numbers in the arbitrary desired range such that the mapped numbers are uniformly distributed; and using the mapped numbers in an application, the application being one of a statistical simulation application, a generative modeling application, a cryptography application, or a Monte Carlo application for simulating physical systems.

22. The computer system of claim 21, wherein applying a generation function to the pseudo-random numbers to generate uniformly distributed packed numbers comprises:

generating one or more unsigned component packed numbers and a signed component packed number; and forming the packed numbers with the component packed numbers by concatenating the unsigned component packed numbers to the signed component packed number.

23. The computer system of claim 21, wherein applying a mapping function to the uniformly distributed packed number to map selected packed numbers comprises:

computing the size of the desired output range;

obtaining those uniformly distributed packed numbers having absolute values that fall in the range $0 \ldots L$, where L provides an optimal match to the desired output range; and mapping each obtained packed number to a corresponding mapped packed number in the desired output range so that the mapped packed number in the desired range is uniformly distributed relative to other mapped packed numbers.

24. A computer-readable medium having stored therein one or more sequences of instruction for mapping pseudo-random numbers to a target range, wherein execution of the one or more sequences of instructions by one or more processors causes the one or more processors to perform operations comprising:

generating a plurality of pseudo-random numbers having a uniform distribution in a source range;

selecting an optimal subset of the plurality of pseudo-random numbers to map; and mapping each of the selected pseudo-random numbers to a corresponding mapped number in the target range such that the mapped numbers are uniformly distributed across the target range; and using the mapped numbers in an application, the application being one of a statistical simulation application, a generative modeling application, a cryptography application, or a Monte Carlo application for simulating physical systems.

25. The computer-readable medium of claim 24, wherein the source range is from 0 . . . R, the target range has a size B, and selecting the optimal subset of pseudo random numbers comprises identifying those pseudo random numbers that fall between 0 and L, where L is derived from R and B and provides an optimal match to the target range.

26. The computer-readable medium of claim 25, wherein R is determined according to the following equation $2^b-1$, where b is the number of input bits.

27. The computer-readable medium of claim 26 further comprising minimizing the number of input bits b needed to generate pseudo-random numbers that fall within the desired output range.

* * * * *